(12) United States Patent
Tam

(10) Patent No.: US 8,931,648 B1
(45) Date of Patent: Jan. 13, 2015

(54) HORIZONTAL FRAME STORAGE SYSTEM

(71) Applicant: Steven Tam, Palmdale, CA (US)

(72) Inventor: Steven Tam, Palmdale, CA (US)

(*) Notice: Subject to any disclaimer, the term of this patent is extended or adjusted under 35 U.S.C. 154(b) by 118 days.

(21) Appl. No.: 13/929,194

(22) Filed: Jun. 27, 2013

Related U.S. Application Data

(60) Provisional application No. 61/832,479, filed on Jun. 7, 2013.

(51) Int. Cl.
| | |
|---|---|
| *A47F 7/00* | (2006.01) |
| *B62H 3/00* | (2006.01) |
| *A47B 91/00* | (2006.01) |
| *A47G 29/00* | (2006.01) |
| *F16M 11/26* | (2006.01) |

(52) U.S. Cl.
CPC .................................. *B62H 3/00* (2013.01)
USPC .. 211/17; D12/407; 248/346.01; 248/346.05; 248/188.5

(58) Field of Classification Search
CPC ............... B60R 9/10; B60R 9/04; B62H 3/00
USPC .............. 211/17–24; 224/924; D12/407, 408; 410/3; 248/346.01, 346.05, 188, 188.1, 248/188.4
See application file for complete search history.

(56) References Cited

U.S. PATENT DOCUMENTS

| | | | | |
|---|---|---|---|---|
| 1,113,371 A | * | 10/1914 | Pajeau | 446/126 |
| 1,322,719 A | * | 11/1919 | Nelson | 280/35 |
| 2,709,318 A | * | 5/1955 | Benjamin | 446/103 |
| D212,967 S | * | 12/1968 | Glenn | D26/13 |
| 3,695,458 A | * | 10/1972 | Nagel | 211/194 |
| 3,747,261 A | * | 7/1973 | Salem | 446/104 |
| D233,517 S | * | 11/1974 | Girvin | D12/407 |
| 3,901,421 A | * | 8/1975 | Kalicki et al. | 224/310 |
| 3,952,983 A | * | 4/1976 | Crochet | 248/173 |
| D261,794 S | * | 11/1981 | Bechtel | D22/108 |
| 4,875,608 A | * | 10/1989 | Graber | 224/493 |
| 4,998,114 A | * | 3/1991 | Eto et al. | 343/840 |
| 5,067,268 A | * | 11/1991 | Ransom | 42/94 |
| 5,127,564 A | * | 7/1992 | Romero | 224/403 |
| 5,305,571 A | * | 4/1994 | Trevino | 52/653.2 |
| 5,333,825 A | * | 8/1994 | Christensen | 248/188.2 |
| 5,494,386 A | * | 2/1996 | Paull | 410/77 |
| 5,826,121 A | * | 10/1998 | Cardellini | 396/428 |
| 5,899,422 A | * | 5/1999 | Eke | 248/188.4 |
| 5,904,463 A | * | 5/1999 | Christensen | 414/462 |
| 6,229,497 B1 | * | 5/2001 | McCracken | 343/878 |
| 6,394,326 B1 | * | 5/2002 | Lanier | 224/405 |
| 6,592,093 B2 | * | 7/2003 | Valentz | 248/346.01 |
| 6,669,163 B2 | * | 12/2003 | Davis, Jr. | 248/346.01 |
| 6,705,822 B2 | * | 3/2004 | Oldak | 414/532 |
| D498,412 S | * | 11/2004 | Pehta et al. | D8/374 |
| 6,834,786 B2 | * | 12/2004 | Hansen | 224/403 |
| 6,868,998 B2 | * | 3/2005 | Dean | 224/324 |
| 6,902,363 B2 | * | 6/2005 | Couto | 410/3 |
| 7,143,998 B1 | * | 12/2006 | Hall | 254/98 |
| 7,246,732 B1 | * | 7/2007 | Ha | 224/483 |
| 7,267,318 B2 | * | 9/2007 | Kennard, IV | 248/562 |

(Continued)

*Primary Examiner* — Joshua J Michener
*Assistant Examiner* — Devin Barnett
(74) *Attorney, Agent, or Firm* — Plager Schack LLP

(57) ABSTRACT

A horizontal frame support assembly allows a user to raise a frame with an irregular shape from a surface. The horizontal frame support assembly comprises a hub section mechanically coupled to a plurality of arms where each arm is attached to a frame support. Each frame support is configured to receive a portion of the frame with the irregular shape and has sufficient height to lift the frame from the surface.

5 Claims, 3 Drawing Sheets

(56) References Cited

U.S. PATENT DOCUMENTS

| | | | |
|---|---|---|---|
| D564,867 S * | 3/2008 | Levin | D8/374 |
| 7,604,207 B2 * | 10/2009 | Hasloecher et al. | 248/171 |
| 7,648,317 B2 * | 1/2010 | Kobacker et al. | 410/3 |
| 7,681,847 B2 * | 3/2010 | Levin | 248/188.2 |
| 7,686,549 B1 * | 3/2010 | Posey | 410/3 |
| 7,703,729 B1 * | 4/2010 | Nourollahi | 248/188.9 |
| 7,850,407 B2 * | 12/2010 | Burry et al. | 410/3 |
| D630,573 S * | 1/2011 | Pedrini | D12/408 |
| 8,444,419 B2 * | 5/2013 | Driskell et al. | 434/211 |
| 8,544,812 B2 * | 10/2013 | Wilson | 248/503 |
| 8,840,079 B2 * | 9/2014 | Lin et al. | 248/349.1 |
| 2003/0178538 A1 * | 9/2003 | Hasloecher et al. | 248/177.1 |
| 2005/0151044 A1 * | 7/2005 | Settele | 248/346.01 |
| 2005/0183234 A1 * | 8/2005 | Bushey et al. | 16/42 R |
| 2005/0191144 A1 * | 9/2005 | Couto | 410/3 |
| 2006/0171790 A1 * | 8/2006 | Macomber, III | 410/3 |
| 2007/0102465 A1 * | 5/2007 | Wezyk et al. | 224/321 |
| 2011/0095146 A1 * | 4/2011 | King et al. | 248/157 |
| 2014/0048678 A1 * | 2/2014 | Chen et al. | 248/678 |

* cited by examiner

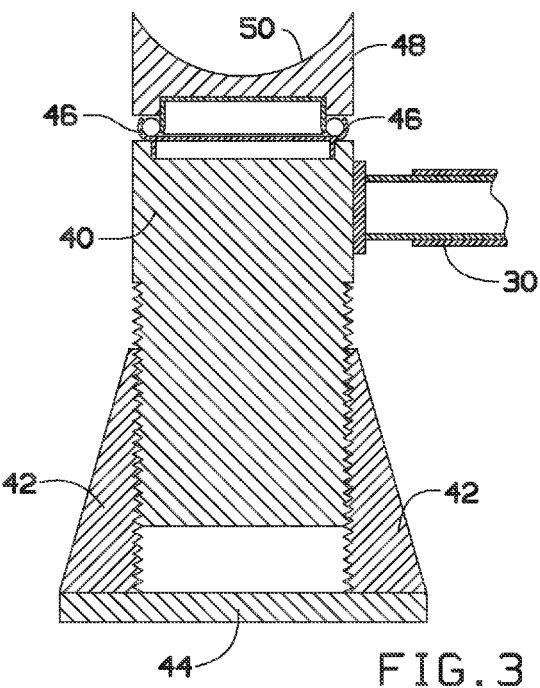
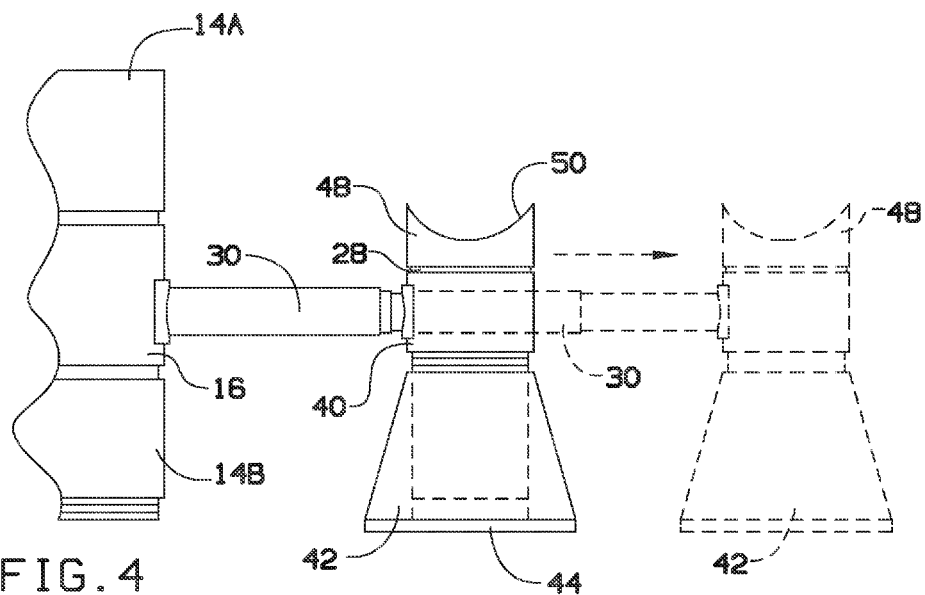

HORIZONTAL FRAME STORAGE SYSTEM

RELATED APPLICATION

This application claims priority to provisional patent application U.S. Ser. No. 61/832,479 filed on Jun. 7, 2013, the entire contents of which is herein incorporated by reference.

BACKGROUND

The embodiments herein relate generally to devices that assist a user in storing a horizontal frame.

An example of a horizontal frame, shown in the description below is a bicycle frame. As is well known, a bicycle frame comprises a top tube mechanically coupled to a seat tube and a front tube. The seat tube is further mechanically coupled to a seat stay, a down tube and a chain stay. The down tube is further mechanically coupled to the front tube and the chain stay. The chain stay is further mechanically coupled to the seat stay.

Prior to the disclosed invention, bicycles were stored on the roof of a car, but could not be efficiently stored in the trunk of a vehicle because of the irregular shape of the bicycle. Embodiments of the present invention resolve this problem.

SUMMARY

A horizontal frame support assembly allows a user to raise a frame with an irregular shape from a surface. The horizontal frame support assembly comprises a hub section mechanically coupled to a plurality of arms where each arm is attached to a frame support. Each frame support is configured to receive a portion of the frame with the irregular shape and has sufficient height to lift the frame from the surface. In some embodiments, each arm can telescope enabling a user to move each frame support proximate and distant the hub section. The central hub can comprise a lower threaded portion that can be coupled to an upper threaded portion of a hub lower section to increase the height of the hub lower section.

Each frame support can be threaded and attached to a frame support base to enable a user to rotate the frame support base to change the height of the frame support in order to lift the frame with the irregular shape from the surface. The frame supports can be threaded and attached to a frame support base which is further attached to a frame support disc made of a ceramic material to enable the frame support to easily slide along a carpeted surface. Each frame support can be attached to a frame support top with a bearing to turn the frame support top. The frame support top can further comprise a cradle surface with a parabolic cylinder shape which is useful for controlling a cylinder such as a seat tube, a down tube or a top tube.

BRIEF DESCRIPTION OF THE FIGURES

The detailed description of some embodiments of the invention will be is made below with reference to the accompanying figures, wherein like numerals represent corresponding parts of the figures.

FIG. 3 is a section view of an embodiment of the invention, taken along line 3-3 in FIG. 2

FIG. 4 is a side view of an embodiment of the invention, illustrating the extension of the arms.

DETAILED DESCRIPTION OF CERTAIN EMBODIMENTS

Figure 1:
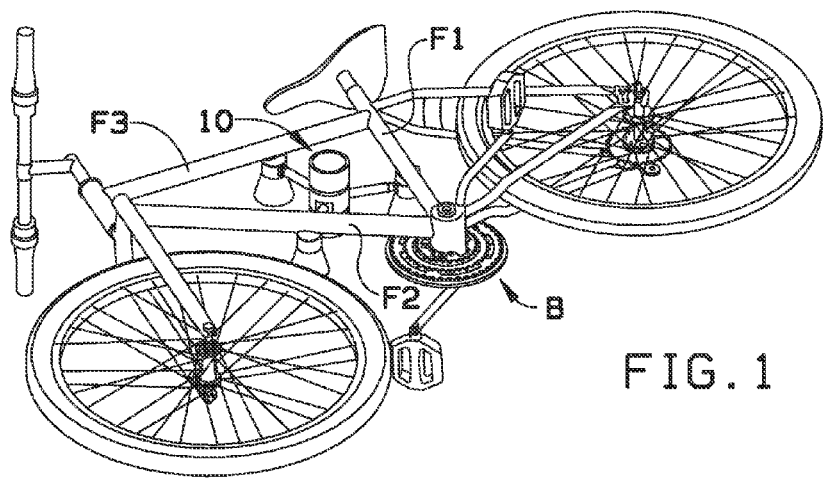
FIG. 1 is a perspective view of an embodiment of the invention, shown in use.

By way of example, and referring to FIG. 1, one embodiment of the present system comprises horizontal frame support system 10 which can support bicycle B by lifting seat tube F1, down tube F2 and top tube F3 from a surface (collectively frame F).

Figure 2:
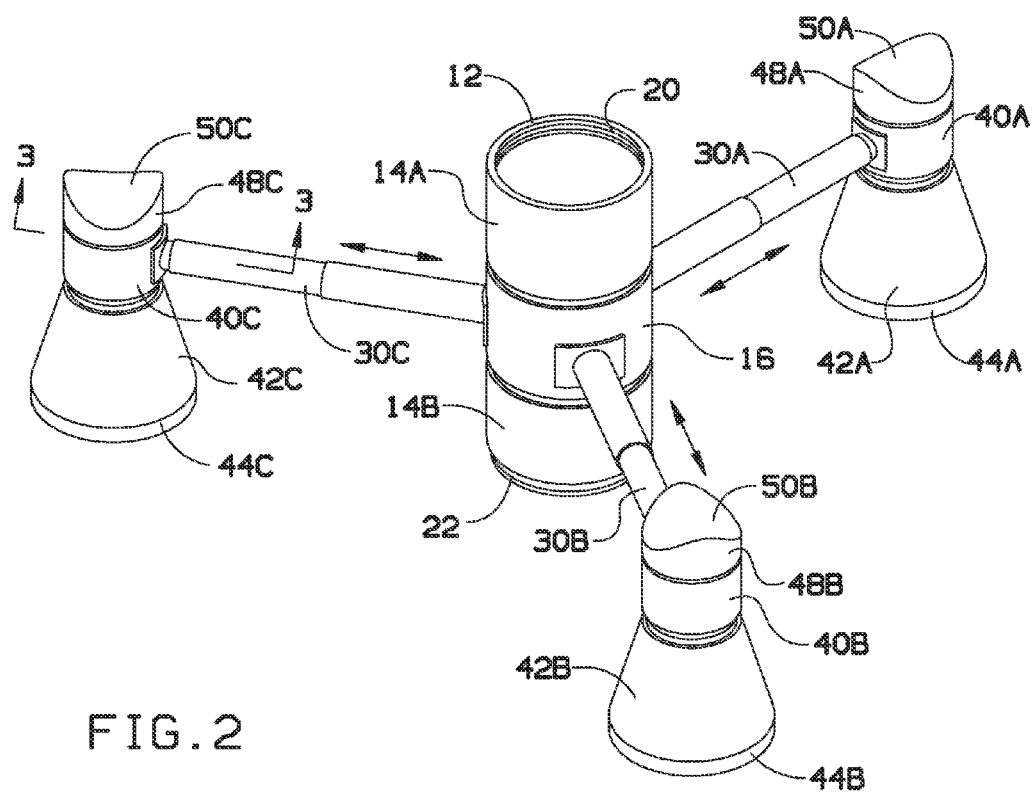
FIG. 2 is a perspective view of an embodiment of the invention.

Turning to FIG. 2, hub system 12 is mechanically coupled to three arms 20 which are each mechanically coupled to a frame support 40 which are configured to accommodate frame F. Frame support 40 is shown in more detail in FIG. 3. Arm 30 is shown in more detail in FIG. 4 and FIG. 5. A unique stacking feature is demonstrated in FIG. 6.

Figure 5:
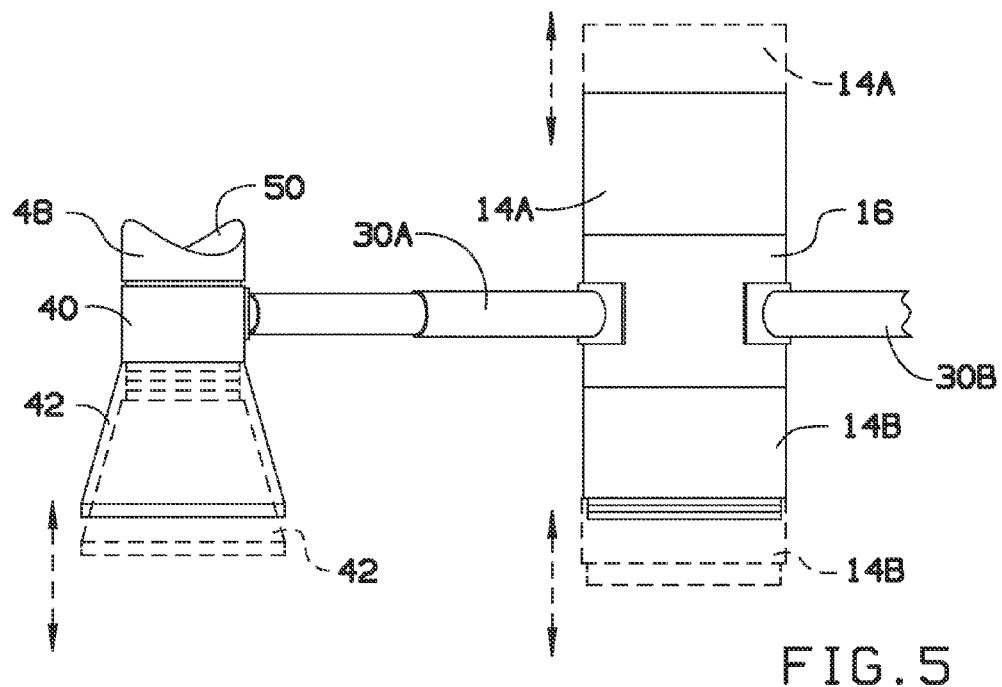
FIG. 5 is a side view of an embodiment of the invention, illustrating the height adjustment of the supports and hub.
Figure 6:
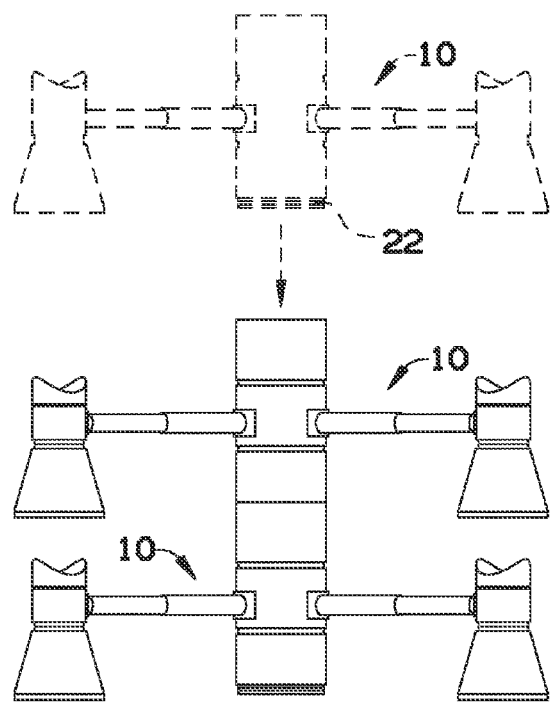
FIG. 6 is a side view of an embodiment of the invention, illustrating the coupling of second unit.

Hub system 12 comprises hub top section 14A mechanically coupled to hub center section 16 which is further mechanically coupled to hub lower section 14B. In this embodiment, each hub section contains an upper portion which is threated with female thread 20 and a lower portion which is threaded with male thread 22. Threading provides at least three advantages, first is modularity, additional hub sections 14 can be added to raise hub center section 16 as desired as shown in FIG. 5. This can be fine-tuned by slightly turning female thread 20 away from male thread 22. A second advantage is capacity, a user can combine a first horizontal frame support system 10A to a second horizontal frame support system 10B to accommodate additional frames F. A third advantage is security, threads 20 and 22 can hold hub sections 14 and 16 together more securely than using no fastener.

Center hub section 16 is mechanically coupled to first arm 30A, second arm 30B and third arm 30C. First arm 30A is mechanically coupled to first frame support 40A. First frame support 40A is detachably coupled to first frame support base 42A. First frame support base 42A is mechanically coupled to first frame support disc 44A. First frame support 40A is further mechanically coupled to first frame support top 48A which comprises first cradle surface 50A.

Likewise, second arm 30A is mechanically coupled to second frame support 40A. Second frame support 40A is detachably coupled to second frame support base 42A. Second frame support base 42A is mechanically coupled to second frame support disc 44A. Second frame support 40A is further mechanically coupled to second frame support top 48A which comprises second cradle surface 50A.

Similarly, third arm 30A is mechanically coupled to third frame support 40A. Third frame support 40A is detachably coupled to third frame support base 42A. Third frame support base 42A is mechanically coupled to third frame support disc 44A. Third frame support 40A is further mechanically coupled to third frame support top 48A which comprises third cradle surface 50A.

Turning to FIG. 3, in some embodiments, frame support 40 is threaded as is frame support base 42. This enables a user to rotate frame support base 42 to change the height of frame support 40. In some embodiments, frame support disc 44 is made of a ceramic material that enables frame support 40 to easily slide along a carpeted surface such as one found in the truck of a car. Frame support 40 is mechanically coupled to bearing 46 which is further mechanically coupled to frame surface top 48 that can enable a user to rotate frame surface top 48 to accommodate frame F.

As shown in FIG. 4, each arm 30 is shown in a telescoping embodiment that can enable a user to move each frame support 40 proximate and distant hub section 16 as shown in more detail in FIG. 5. This enables a user to accommodate a large number of different kinds of frames F with a single horizontal frame support system 10. Cradle surface 50 has a parabolic cylinder shape which is useful for controlling a cylinder such as seat tube F1, down tube F2 and top tube F3, but many other shapes can be used depending on the shape of the frame that a user desires to hold with the frame support.

As shown in FIG. 5, a user can utilize additional hub lower sections 14 along with the threaded portions of frame support base 42 to change the height of frame support 40. This can allow a user to easily store a frame F with an irregular shape such as the handle bars of a bicycle extending normal the frame of the bicycle.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A modular horizontal frame support assembly configured to raise and store a bicycle frame above and in parallel with a generally flat surface, said bicycle frame comprising a plurality of interconnected tubular sections, the horizontal frame support assembly comprising,
   a plurality of elongated arms, each arm comprises a first end and an opposite second end;
   a plurality of frame supports; a hub section mechanically coupled to the first end of each of the plurality of arms; wherein the second end of each arm is attached to a corresponding frame support;
   wherein each frame support has a frame support top located above the frame support, each frame support top is mechanically coupled to a corresponding frame support with a bearing to rotate the frame support top with respect to the corresponding frame support, and each frame support top further comprises a cradle surface at the top of each frame support top; wherein each cradle surface has an upwardly facing concave recess that is configured and sized to receive a corresponding tubular section of said bicycle frame to lift the bicycle frame above the flat surface;
   wherein an upper portion of the hub section includes a first thread; and a lower portion of the hub section includes a second thread; wherein the second thread is configured to matingly couple to a first thread on a second hub section to securely stack the corresponding upper hub section on top of the second hub section in order to further raise the height of the bicycle frame above the flat surface.

2. The modular horizontal flame support assembly of claim 1, wherein each arm telescopes enabling a user to move each frame support a distance proximate and distant to the hub section.

3. The modular horizontal flame support assembly of claim 1, wherein each frame support is threaded and attached to a lower frame support base to enable a user to rotate a corresponding frame support base to change the height of the corresponding frame support in order to lift the bicycle frame from the flat surface.

4. The modular horizontal frame support assembly of claim 1, wherein each frame support is threaded and attached to a lower frame support base and each frame support base is further mechanically coupled to a frame support disc made of a ceramic material to enable the frame supports to easily slide along a carpeted surface.

5. A horizontal frame support assembly, configured to store a plurality of bicycle frames in a stacking arrangement and raise the plurality of bicycle frames above and in parallel with a generally flat surface, the horizontal frame support assembly, comprising:
   a first hub system mechanically coupled to a first plurality of arms where each arm is attached to a frame support;
   wherein each frame support includes a top surface that has an upwardly concaved recess, each upwardly concaved recess is configured and sized to receive a tubular portion of a first bicycle frame and lift the first bicycle frame above the flat surface;
   a second hub system detachable coupled to the first hub system, wherein the second hub system further comprises: a second plurality of arms extending from the second hub system, wherein each arm of said second plurality of arms is attached to a second frame support; wherein each second frame support includes a top surface that has an upwardly concaved recess, each upwardly concaved recess is configured and sized to receive a tubular portion of a second bicycle frame, wherein, when the second hub system is staked on top of the first hub system, a spacing is provided between each top surface of the corresponding first frame supports and a lower surface of the corresponding second frame supports of the second frame, wherein the spacing is large enough for the first bicycle frame to be stored therein, wherein the second hub system lifts the second bicycle frame above the first bicycle frame thereby enbabling the horizontal frame support assembly to store at least two bicycles in a stakable manner above and in parallel with the flat surface.

* * * * *